United States Patent
Ardö

(10) Patent No.: US 12,114,076 B2
(45) Date of Patent: Oct. 8, 2024

(54) DIFFERENTIAL FRAME RATE SETTINGS

(71) Applicant: Axis AB, Lund (SE)

(72) Inventor: Björn Ardö, Lund (SE)

(73) Assignee: AXIS AB, Lund (SE)

( * ) Notice: Subject to any disclaimer, the term of this patent is extended or adjusted under 35 U.S.C. 154(b) by 43 days.

(21) Appl. No.: 18/160,330

(22) Filed: Jan. 27, 2023

(65) Prior Publication Data

US 2023/0262335 A1  Aug. 17, 2023

(30) Foreign Application Priority Data

Feb. 15, 2022 (EP) .................................... 22156682

(51) Int. Cl.
*H04N 23/698* (2023.01)
*H04N 5/265* (2006.01)
*H04N 23/45* (2023.01)
*H04N 23/61* (2023.01)
*H04N 23/62* (2023.01)

(52) U.S. Cl.
CPC ........... *H04N 23/698* (2023.01); *H04N 5/265* (2013.01); *H04N 23/45* (2023.01); *H04N 23/61* (2023.01); *H04N 23/62* (2023.01)

(58) Field of Classification Search
CPC ...... H04N 23/698; H04N 23/61; H04N 23/45; H04N 23/62; H04N 5/265
See application file for complete search history.

(56) References Cited

U.S. PATENT DOCUMENTS

| 10,033,942 | B1* | 7/2018 | Tanner .................... H04N 23/90 |
| 10,348,949 | B2 | 7/2019 | He et al. |
| 2014/0132735 | A1 | 5/2014 | Lee et al. |
| 2015/0162048 | A1* | 6/2015 | Hirata ............... G11B 20/10527 386/341 |
| 2015/0321607 | A1 | 11/2015 | Cho et al. |
| 2020/0195845 | A1 | 6/2020 | Stening et al. |
| 2021/0058547 | A1* | 2/2021 | Puttamalla ............. H04N 23/60 |

FOREIGN PATENT DOCUMENTS

| CN | 106652448 A | 5/2017 |
| CN | 114007023 A | 2/2022 |
| EP | 3833003 A1 | 6/2021 |

OTHER PUBLICATIONS

Extended European Search Report dated Aug. 3, 2022 for European Patent Application No. 22156682.1.

* cited by examiner

*Primary Examiner* — James T Boylan
(74) *Attorney, Agent, or Firm* — Volpe Koenig

(57) ABSTRACT

There is provided techniques for setting frame rates of a camera. The camera comprises a plurality of image sensors arranged to capture images to be stitched into a panorama image of a scene. Information of a respective angle between the optical axis of each of the plurality of image sensors and a direction along which a straight path structure, to be monitored by the camera, extends through the scene is obtained. The plurality of image sensors are divided into at least two groups as a function of the angles. All the angles of the image sensors within each of the at least two groups are part of its own continuous angle interval. One frame rate is set per each of the at least two groups. The frame rate decreases from the group with highest continuous angle interval towards the group with lowest continuous angle interval.

15 Claims, 7 Drawing Sheets

DIFFERENTIAL FRAME RATE SETTINGS

TECHNICAL FIELD

Embodiments presented herein relate to a method, a controller, a computer program, and a computer program product for setting frame rates of a camera.

BACKGROUND OF THE INVENTION

In general terms, panoramic cameras provide a wide-area coverage, hereinafter denoted a panorama image, of a scene with just one camera. Panoramic cameras can be used to monitor scenes composed of physical structures, activities and detect incidents in large areas, track the flow of people, vehicles, or other types of objects, and improve area management. Using such a panoramic camera instead of multiple cameras with narrow-area cover might simplify installations, as well as reducing cost.

Panoramic cameras comprise two or more, or even a plurality, of image sensors. Each image sensor is arranged with its own field of view, but the field of view of two adjacently placed image sensors in the panoramic camera are slightly overlapping. This enables images from different image sensors to be stitched together to form a single panorama image. In this respect, image stitching, or photo stitching, is the process of combining multiple images with overlapping fields of view to produce a segmented panorama or high-resolution image. The image stitching commonly involves image registration, calibration, and blending.

Panorama images as captured over time can be combined into video segments. Such video segments could then be subjected to further analysis, such as object detection and identification, and/or be provided for display to a user. The larger the number of image sensors used to capture the images to be stitched and the higher the frame rate used by the image sensors, the larger amount of data is produced and the higher the computational demands, and the power consumption, will be for creating and processing video segments from panorama images. High power consumption might increase the heat generation in the camera.

However, there could be situations where the available data storage is limited, where the computational demands (e.g., for decoding) need to be kept low, where the power consumption needs to be limited, and/or where the bitrate, or bandwidth, required for communication between different entities involved in creating video segments from panorama images. One way to reduce these needs is to reduce the resolution of the images, or use a compression scheme with a comparatively high compression rate. However, this might cause details in the scene to be monitored to be lost, thus compromising security.

SUMMARY OF THE INVENTION

A plurality of embodiments herein is to address the above issues.

In general terms, according to the herein disclosed inventive concept, the frame rates are set differently for different image sensors of the camera.

According to a first aspect, the concepts are defined by a method for setting frame rates of a camera. The camera comprises a plurality of image sensors arranged to capture images to be stitched into a panorama image of a scene. Each of the plurality of image sensors has a respective optical axis. The method is performed by a controller. The method comprises obtaining information of a respective angle between the optical axis of each of the plurality of image sensors and a direction along which a straight path structure, to be monitored by the camera, extends through the scene. The method comprises dividing the plurality of image sensors into at least two groups as a function of the angles. All the angles of the image sensors within each of the at least two groups are part of its own continuous angle interval. The method comprises setting one frame rate per each of the at least two groups. The frame rate decreases from the group with highest continuous angle interval towards the group with lowest continuous angle interval.

According to a second aspect, the concepts are defined by a controller for setting frame rates of a camera. The camera comprises a plurality of image sensors arranged to capture images to be stitched into a panorama image of a scene. Each of the plurality of image sensors has a respective optical axis. The controller comprises processing circuitry. The processing circuitry is configured to cause the controller to obtain information of a respective angle between the optical axis of each of the plurality of image sensors and a direction along which a straight path structure, to be monitored by the camera, extends through the scene. The processing circuitry is configured to cause the controller to divide the plurality of image sensors into at least two groups as a function of the angles. All the angles of the image sensors within each of the at least two groups are part of its own continuous angle interval. The processing circuitry is configured to cause the controller to set one frame rate per each of the at least two groups. The frame rate decreases from the group with highest continuous angle interval towards the group with lowest continuous angle interval.

According to a third aspect, the concepts are defined by a system. The system comprises a controller according to the second aspect and a camera arranged as in the second aspect.

According to a fourth aspect, the concepts are defined by a computer program for setting frame rates of a camera, the computer program comprising computer program code which, when run on a controller, causes the controller to perform a method according to the first aspect.

According to a fifth aspect, the concepts are defined by a computer program product comprising a computer program according to the fourth aspect and a computer readable storage medium on which the computer program is stored. The computer readable storage medium could be a non-transitory computer readable storage medium.

Advantageously, these aspects address the above issues by requiring less data storage and/or by requiring less computational demands for producing panorama images.

Advantageously, by lowering the frame rate for some of the sensors compared to other ones of the sensors enables savings to be made both in terms of computational resources and the (average) bitrate of the final video stream.

Advantageously, the thus saved computational resources and the lowered frame rate could in turn lower the overall power and energy consumption of the camera or allow the image resolution of the camera to be increased.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The concepts will now be described more fully hereinafter with reference to the accompanying drawings, in which certain embodiments of the concepts are shown. These concepts may, however, be embodied in many different forms and should not be construed as limited to the embodiments set forth herein; rather, these embodiments are provided by way of example so that this disclosure will be thorough and complete, and will fully convey the scope of the concepts to those skilled in the art. Like numbers refer to like elements throughout the description. Any step or feature illustrated by dashed lines should be regarded as optional.

Figure 1:
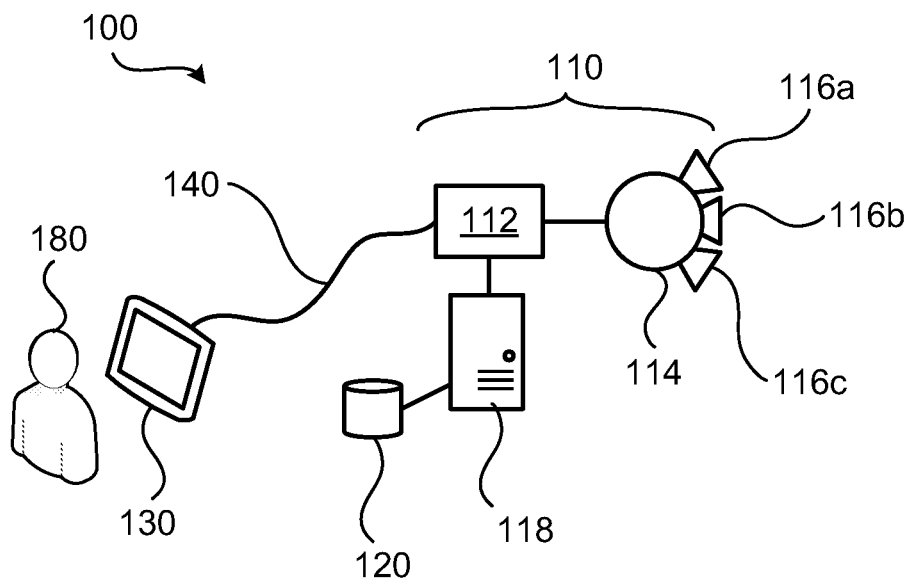
FIG. 1 is a schematic diagram illustrating a system according to embodiments.

FIG. 1 is a schematic diagram illustrating a scenario 100 where embodiments presented herein can be applied. A system 110 comprises a camera 114 and a controller 112 for controlling the camera 114. In turn, the camera 114 comprises image sensors 116a, 116b, 116c. As will be further disclosed below, the camera 114 might comprise more than image sensors 116a, 116b, 116c. In general terms, the camera 114 is, by means of the image sensors 116a, 116b, 116c, configured to capture image frames depicting a scene within a field of view. In some examples the camera 114 is a digital camera. In some examples the camera 114 is capable of mechanical or digital pan, tilt and/or zoom (PTZ). The system 110 is configured to communicate with a user interface 130 for displaying the captured image frames. Further, the system 110 is configured to encode the images such that it can be decoded using any known video coding standard, such as any of: High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 AOMedia Video 1 (AV1), Motion JPEG (M-JPEG or MJPEG, where JPEG is short for Joint Photographic Experts Group), just to give some examples. In this respect, the encoding might be performed either directly in conjunction with the image sensors 116a, 116b, 116c capturing the image frames or at another entity, and then, at least temporarily, stored in a database 120. The system 110 might comprise further entities, functions, nodes, and devices, as represented by device 118. Examples of such further entities, functions, nodes, and devices are computing devices, communication devices, servers, sensors, positioning devices, etc. At reference numeral 140 is illustrated an example connection between the system 110 and the user interface 130. The connection 140 might be wired, wireless, or partly wired and partly wireless. A user 180 might interact with the user interface 130. It is understood that the user interface 130 at least partly is a visual user interface since it is configured to display the image frames captured by the image sensors 116a, 116b, 116c of the camera 114.

Figure 2:
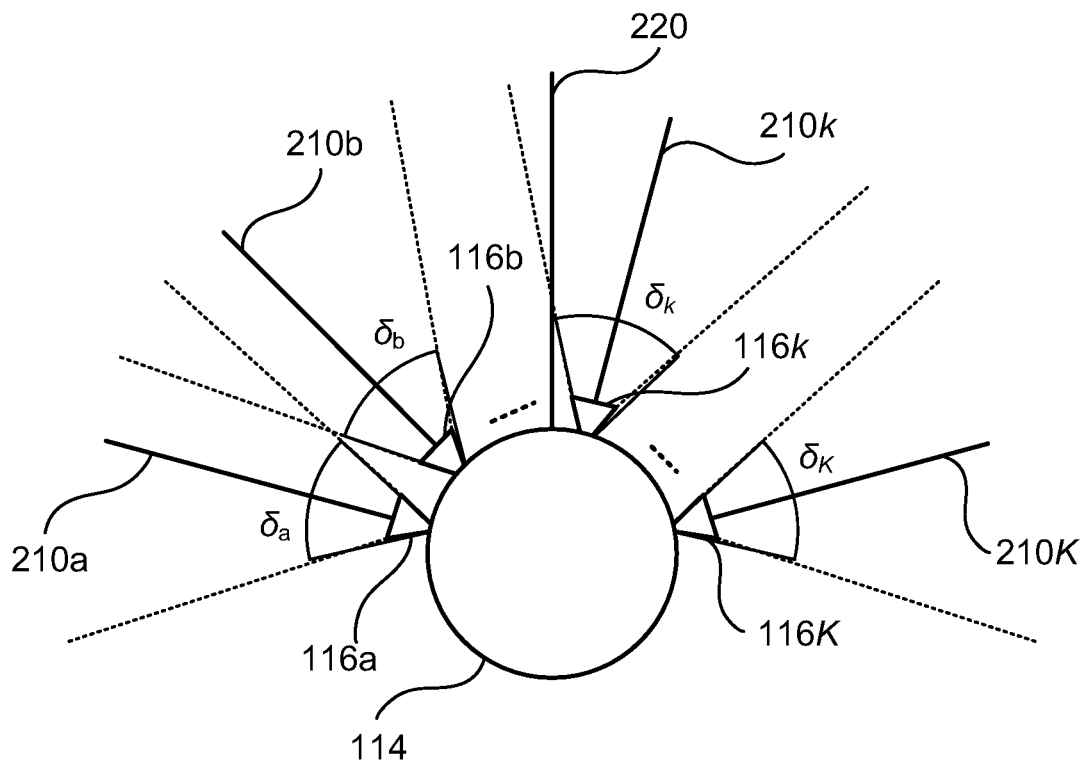
FIG. 2 schematically illustrates a camera according to an embodiment.

Further aspects of the camera 114 will be disclosed next with reference to FIG. 2. According to the illustrative example of FIG. 2 the camera 114 comprises K image sensors 116a, 116b, . . . , 116k, . . . , 116K. Each of the image sensors 116a:116K is configured to capture images within a respective horizontal field-of-view as represented by angles $\delta_a, \delta_b, \ldots, \delta_k, \ldots, \delta_K$. Each image sensor also has a vertical field-of-view (not shown). The image sensors 116a:116K might collectively span a horizontal field-of-view of between 120° and 185°. In order to avoid clutter, in the illustrative example of FIG. 2 the image sensors 116a:116K collectively span a horizontal field-of-view of about 220°. The angle bisector of each field-of-view defines the optical axis 210a, 210b, . . . , 210k, . . . , 210K of each image sensor 116a:116K. The camera 114 has a camera axis 220. In some examples, the camera axis 220 defines the bore sight direction of the camera 114. In some examples, the camera axis 220 is the axis around which the camera 114 is pivotable when mounted. In some examples, the camera axis 220 is given by the mean value of the optical axes 210a:210K of all the image sensors 116a:116K. In general terms, the camera 114 is assumed to be arranged to monitor a straight path structure from an elevated position. Non-limiting examples of such straight path structures are: a vehicle road, a pedestrian road, an office corridor, a railroad track, an airport taxiway, an airport runway, a canal for boats, a part of, or a track of, a sports arena. Further, the image sensors 116a:116K arranged to capture images to be stitched into a panorama image of a scene. The scene is thus assumed to comprise one or more straight path structures to be monitored.

Figure 3:
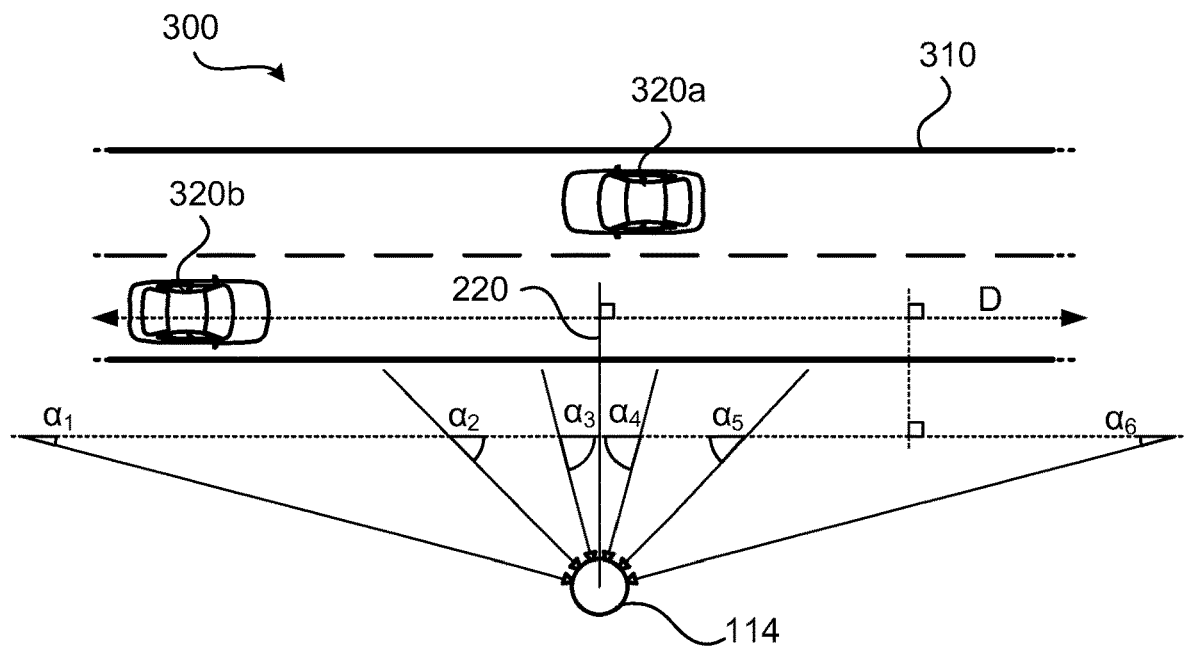
FIG. 3 schematically illustrates first scenario according to an embodiment.

FIG. 3 schematically illustrates a first scenario 300 of the herein disclosed inventive concept. According to the first scenario 300, a camera 114 is to monitor a straight path structure 310 in the form of a vehicle road. The camera 114 might be mounted, or fixed, to a post, a pillar, a building, or another vertically extending physical structure. The camera 114 might be located 3-5 meters above a surface of the straight path structure 310. In this respect, the camera 114 might be tilted downwards so that the straight path structure 310 is captured within the vertical and horizontal field-of-view of the image sensors. Two objects 320a, 320b in the form of cars are depicted as travelling along the vehicle road. The straight path structure 310 extends along a direction D. In the illustrative example of FIG. 3, the camera axis 220 is thus perpendicular to the direction D along which the straight path structure 310 extends through the scene 300. The camera 114 comprises six image sensors. The optical axes of the image sensors are illustrated as radiating from the camera 114. The optical axis of each of the image sensors has an own angle with respect to the direction D. These angles are in FIG. 3 illustrated at $\alpha_1, \alpha_2, \alpha_3, \alpha_4, \alpha_5, \alpha_6$. The angles $\alpha_1, \alpha_2, \alpha_3, \alpha_4, \alpha_5, \alpha_6$ thus represent the angles between the optical axes of the six image sensors and the direction D. That is, $\alpha_1$ is the angle between the optical axis of the left-most image sensor and the direction D, $\alpha_2$ is the angle between the optical axis of the second to left-most image sensor and the direction D, and $\alpha_6$ is the angle between the optical axis of the right-most image sensor and the direction D, and so on. For the herein disclosed concepts, the sign of the angles will be of no interest, and hence the angles are hereinafter assumed to be represented by their absolute values only. That is, in the scenario 300, $\alpha_1=\alpha_6$ (within some margin), and so on.

Figure 4:
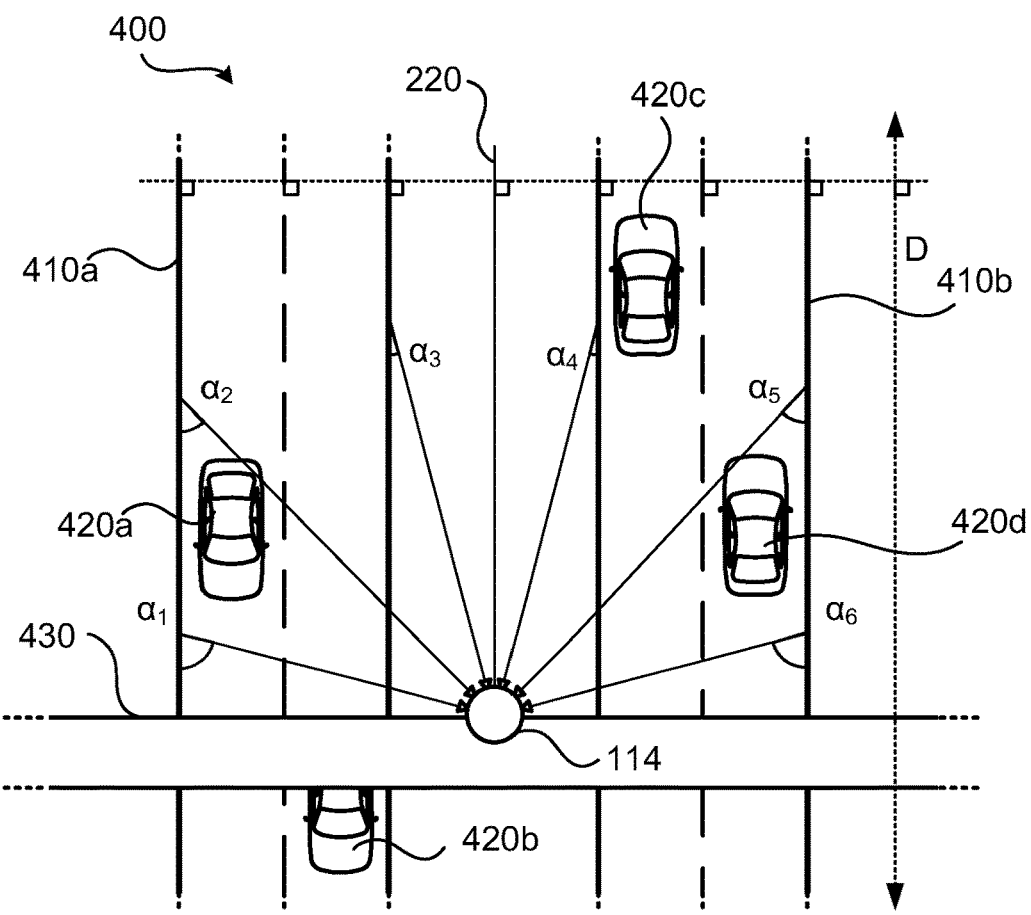
FIG. 4 schematically illustrates a second scenario according to an embodiment.

FIG. 4 schematically illustrates a second scenario 400 of the herein disclosed concepts. According to the second scenario 400, a camera 114 is to monitor two straight path structures 410a, 410b, both in the form of a vehicle road. The camera 114 might be mounted, or fixed, to a post, a pillar, a building, or another vertically extending physical structure. In the illustrative example of FIG. 4, the camera 114 is mounted on a bridge 430 and may be located approximately 5 meters above a surface of the straight path structure 410a, 410b. In this respect, the camera 114 might be tilted downwards so that the straight path structures 410a, 410b are captured within the vertical and horizontal field-of-view of the image sensors. Four objects 420a, 420b, 420c, 420d in the form of cars are depicted as travelling along the vehicle roads. The straight path structures 410a, 410b both extend along a direction D. In the illustrative example of FIG. 4, the camera axis 220 is thus perpendicular to the direction D along which the straight path structures 410a, 410b extend through the scene 400. As in the scenario 300, the camera 114 comprises six image sensors. The optical axes of the image sensors are illustrated as radiating from the camera 114. The optical axis of each of the image sensors has its own angle with respect to the direction D. As in the scenario 300, these angles are in FIG. 4 illustrated at $\alpha_1, \alpha_2, \alpha_3, \alpha_4, \alpha_5, \alpha_6$. The angles $\alpha_1, \alpha_2, \alpha_3, \alpha_4, \alpha_5, \alpha_6$ thus represent the angles between the optical axes of the six image sensors and the direction D. As in the scenario 300, $\alpha_1$ is the angle between the optical axis of the left-most image sensor and the direction D, $\alpha_2$ is the angle between the optical axis of the second to left-most image sensor and the direction D, and $\alpha_6$ is the angle between the optical axis of the right-most image sensor and the direction D, and so on.

Hence, due to the different geometries in terms of the orientation of the camera axis 220 with respect to the direction D in the two different scenarios 300, 400, each of the angles $\alpha_{k;k=1...K}$ takes a different value in the scenario 400 compared to in the scenario 300. For the scenario 300 the optical axes of the image sensors at the edges have the smallest angles $\alpha_1, \alpha_6$ and the image sensors in the center have the largest angles $\alpha_3, \alpha_4$. That is, for scenario 300: $(\alpha_1, \alpha_6)<(\alpha_2, \alpha_5)<(\alpha_3, \alpha_4)$. The opposite is true for the scenario 400, where thus the optical axes of the image sensors at the edges have the largest angles $\alpha_1, \alpha_6$ and the image sensors in the center have the smallest angles $\alpha_3, \alpha_4$. That is, for scenario 400: $(\alpha_3, \alpha_4)<(\alpha_2, \alpha_5)<(\alpha_1, \alpha_6)$.

Whilst FIG. 3 illustrates a scenario 300 where the camera axis 220 is perpendicular to the direction D along which the straight path structure 310 extends through the scene 300 and FIG. 4 illustrates a scenario 400 where the camera axis 220 is parallel with the direction D along which the straight path structures 410a, 410b extend through the scene 300, 400, there herein disclosed embodiments are not limited to these two types of scenarios 300, 400. The herein disclosed embodiments encompass also other relations between the camera axis 220 and the straight path structures, such as where the camera axis 220 is neither perpendicular nor parallel with the direction D along which the straight path structures 410a, 410b extend through the scene 300, 400 but where this relation takes another value.

Figure 5:
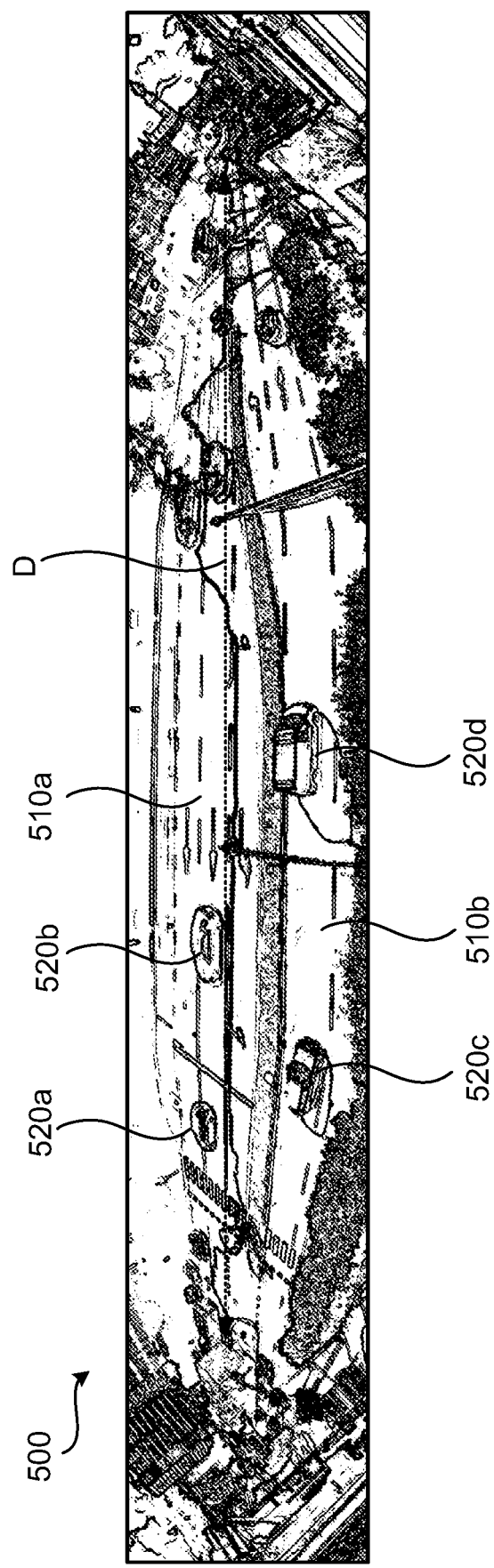
FIG. 5 shows a panorama image according to an embodiment.

FIG. 5 provides, in stylized form, an illustration of a real-world panorama image 500 according to a realization of the camera 114. The panorama image 500 has thus been stitched from images captured by the image sensors 116a:116K of the camera 114. Along a direction D is shown two straight path structures 510a, 510b in terms of vehicle roads. The camera 114 has thus been arranged to monitor the vehicle roads. Four cars representing objects as traveling along the vehicle roads are identified at reference numerals 520a, 520b, 520c, 520d.

With intermediate reference made again to FIG. 2, each of the image sensors 116a:116K has a unique optical axis 210a:210K. This ensures that the image sensors 116a:116K are facing different directions so as to capture partially overlapping parts of the scene. This partial overlap enables images from adjacently placed image sensors to be stitched together. Repeating this stitching for all the image sensors 116a:116k enables a panorama image 500 as in FIG. 5 to be created. In further detail, for this purpose the image sensors are assumed to use a cylindrical projection. This implies that a certain number of pixels along the horizontal image axis corresponds to a certain number of degrees, regardless of these certain number of pixels are located on the middle of the image or at an edge of the image. In this respect, as can be seen in the panorama image 500, the straight path structures 510a, 510b do not appear to be perfectly straight but instead appear to have a curved, or bent, appearance. This is due to the same optical effects of the camera 114 that commonly causes a horizon to appear to have a bent shape in panorama images.

Consider now again scenario 300. Since the vehicle road that is monitored defines a straight path structure 310, the distance travelled by an object traveling along the vehicle road with constant speed will vary when the distance is measured in terms of pixels per time unit. Firstly, the distance varies with a factor that depends on the angle with respect to the camera axis 220 where the object is located along the vehicle road. In scenario 300 this angle is greater for the object 320b than for the object 320a. This factor varies with cosine of this angle. Secondly, the distance varies because the left-hand and right-hand edges of the vehicle road as monitored by the image sensors giving rise to angles $\alpha_1, \alpha_6$ will be physically farther away from the camera 114 than the mid-point of the vehicle road as monitored by the image sensors giving rise to angles $\alpha_3, \alpha_4$. This variation depends on the distance between each part of the vehicle road and the camera 114. The corresponding reasoning holds also for scenario 400. The herein disclosed embodiments are based on utilizing these facts when setting the frame rates of the image sensors 116a:116K.

In some embodiments, the frame rates of the image sensors 116a:116K are set such that those of the image sensors that capture an object that, for a given constant speed, over time, moves relatively few pixels from one image to the next are given a lower frame rate than those of the image sensors that capture the same object that, for the same given constant speed, moves relatively many pixels from one image to the next (for a given frame rate). That is, since how many pixels an object moves from one image to the next depends on the frame rate, i.e., the number of frames per second, the movement, in terms of pixels, of an object is here compared for image sensors with the same frame rate to yield a fair comparison.

Consider scenario 300 and assume that each object 320a, 320b is moving with constant speed. The vehicle, or object, 320a is located close to the mid-point of the vehicle road and the vehicle, or object, 320b is located close to the left-hand edge of the vehicle road as monitored by the camera 114. For the same given constant speed, object 320a will thus, over time, move more pixels from one image to the next than object 320b. The inventor of the herein disclosed inventive concept has realized that this implies that the frame rate of the image sensor capturing images of object 320b can be set lower than of the image sensor capturing images of object 320a without information of object 320b being lost. A user 180 viewing a panorama image corresponding to scenario 300 would still be able to follow the movement of object 320b, without experiencing visual artifacts, for example that any of the vehicles is taking a big leap forward between consecutive images.

For scenario 300 this implies that the frame rates of the image sensors with angles $\alpha_1$, $\alpha_6$ thus could be lower than the frame rates of the image sensors with angles $\alpha_3$, $\alpha_4$. For scenario 400 the situation would be the opposite; the frame rates of the image sensors with angles $\alpha_1$, $\alpha_6$ could be higher than the frame rates of the image sensors with angles $\alpha_3$, $\alpha_4$. This holds because in scenario 400, the vehicle, or object, 420a is closer to the camera 114 than the vehicle, or object, 420c.

The embodiments disclosed herein thus relate to techniques for setting frame rates of a camera 114. In order to obtain such techniques, there is provided a controller 112, a method performed by the controller 112, a computer program product comprising code, for example in the form of a computer program, that when run on a controller, causes the controller to perform the method.

Figure 6:
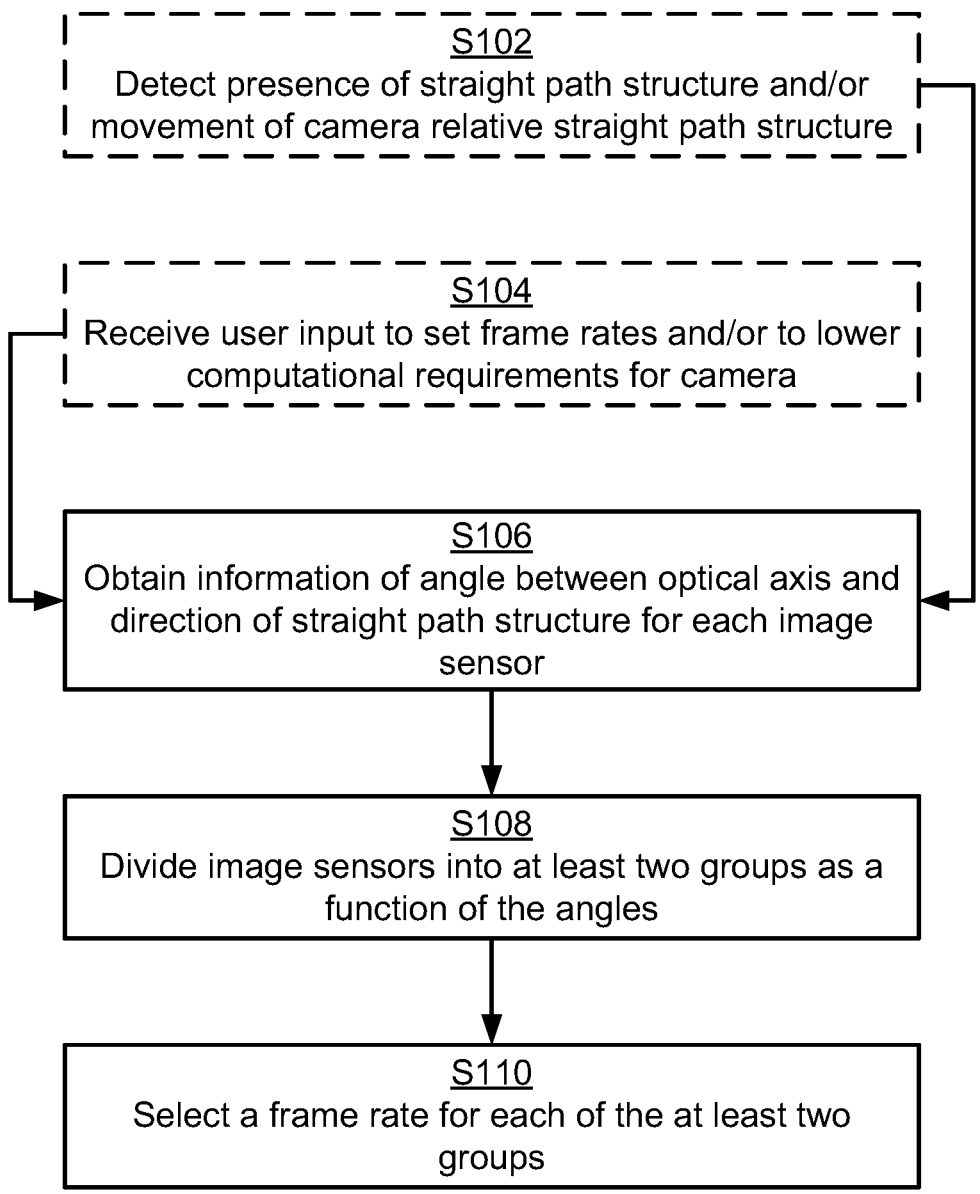
FIG. 6 is a flowchart of methods according to embodiments.

FIG. 6 is a flowchart illustrating embodiments of methods for setting frame rates of a camera 114. The methods are performed by the controller 112. The methods are advantageously provided as computer programs. As disclosed above, the camera 114 comprises a plurality of image sensors 116a:116K arranged to capture images to be stitched into a panorama image 500 of a scene 300, 400. As disclosed above, each of the plurality of image sensors 116a:116K has a respective optical axis 210a:210K.

S106: The controller 112 obtains information of a respective angle $\alpha_{k;k=1 \ldots K}$ between the optical axis 210a:210K of each of the plurality of image sensors 116a:116K and a direction D along which a straight path structure 310, 410a, 410b, 510a, 510b, to be monitored by the camera 114, extends through the scene 300, 400. In this respect, it is assumed that $0° \leq \alpha_{k;k=1 \ldots K} \leq 90°$.

In essence, the frame rates for the image sensors 116a:116K are set depending on the angles $\alpha_{k;k=1 \ldots K}$. The image sensors 116a:116K are therefore divided into groups depending on the values of the angles $\alpha_{k;k=1 \ldots K}$.

S108: The controller 112 divides the plurality of image sensors 116a:116K into at least two groups 820a:820d. The plurality of image sensors 116a:116K are divided into groups 820a:820d as a function of the angles $\alpha_{k;k=1 \ldots K}$. All the angles $\alpha_{k;k=1 \ldots K}$ of the image sensors 116a:116K within each of the at least two groups 820a:820d are part of its own continuous angle interval 810a:810e. Examples of this will be disclosed below with reference to FIG. 8, and hence reference numerals as used in FIG. 8 are included here for ease of reference.

In essence, the frame rates for the image sensors 116a:116K are set depending on the angles $\alpha_{k;k=1 \ldots K}$ such that the frame rate decreases with decreased angle $\alpha_{k;k=1 \ldots K}$.

S110: The controller 112 sets one frame rate per each of the at least two groups 820a:820d. The frame rate is decreasing from the group 820b with highest continuous angle interval 810b, 810e towards the group 820a, 820c with lowest continuous angle interval 810a, 810c. That is, the image sensors in the group 820b with highest continuous angle interval 810b, 810e have highest frame rate, and the image sensors in the group 820a, 820c with lowest continuous angle interval 810a, 810c have lowest frame rate.

Embodiments relating to further details of setting frame rates of a camera 114 as performed by the controller 112 will now be disclosed.

There could be different triggers for the controller 112 to set the frame rates of the camera 114 as outlined above.

In general terms, assuming that the camera 114 is to be fixedly mounted (and thus not be moved) to monitor the straight path structure 310, 410a, 410b, 510a, 510b, and assuming that the straight path structure 310, 410a, 410b, 510a, 510b does not change, the frame rates of the camera 114 need only to be set once the camera 114 is deployed. The frame rates of the camera 114 might even be set as part of factory settings.

In further aspects, the frame rates are set upon presence of the straight path structure 310, 410a, 410b, 510a, 510b having been detected and/or upon having detected movement of the camera 114 relative the straight path structure 310, 410a, 410b, 510a, 510b having been detected. Detecting the straight path structure 310, 410a, 410b, 510a, 510b (including the direction D) can be achieved by performing image analysis of an image sequence to detect the actual straight path structure 310, 410a, 410b, 510a, 510b, e.g., the road structure (and from it deduce the direction D), or by detecting moving objects 320a, 320b, 420a:420d, 520a:520d that have a common straight moving direction that defines the direction D. The thus detected common straight moving direction D then defines the location of the straight path structure 310, 410a, 410b, 510a, 510b. The movement of the camera 114 relative the straight path structure 310, 410a, 410b, 510a, 510b could be due to weather conditions, where the orientation of the camera 114 is affected, or impaired, by weather conditions such as wind, snow, rain, or the like. Hence, in some embodiments, the controller 112 is configured to perform (optional) step S102.

S102: The controller 112 detects presence of the straight path structure 310, 410a, 410b, 510a, 510b, and/or movement of the camera 114 relative the straight path structure 310, 410a, 410b, 510a, 510b, by performing object detection and identification in the images.

The frame rates are then set in response to S102 having been performed.

In other aspects, the frame rates are set upon a request from the user 180. Hence, in some embodiments, the controller 112 is configured to perform (optional) step S104.

S104: The controller 112 receives user input to for setting frame rates of the camera 114, and/or to lower computational requirements for the camera 114.

The frame rates are then set in response to S104 having been performed.

There may be different ways to group the image sensors 116a:116K, and thus to set the frame rates for the image sensors 116a:116K. Different embodiments relating thereto will now be described in turn.

In some embodiments, each of the frame rates takes a value in a set of predetermined frame rate values. In some non-limiting and illustrative examples, such a set of predetermined frame rate values comprises the values 15 frames per second, 30 frames per second, 45 frames per second, 60 frames per second. However, also other values are possible. It is here noted that not all values in the set of predetermined frame rate values need to be used. This depends on how many groups of image sensors 116a:116K are selected.

In some aspects, the image sensors at the perimeter of the camera 114 (thus covering the left and right edges of a horizontally extending panorama image 500) have lower frame rates than the image sensors in the middle. In particular, in some embodiments, the frame rate of any given image sensors 116k of the plurality of image sensors 116a:116K decreases with increased difference between the optical axis 210k of these any given image sensors 116k and the camera axis 220. This could be suitable for scenario 300, whereas the opposite could be suitable for scenario 400.

Since the frame rates are set differently for the different image sensors 116a:116K, this implies that some of the image sensors 116a:116K will produce more images than others of the image sensors 116a:116K. There can therefore be different ways for selecting which images that are to be stitched together to form the panorama image 500.

In some aspects, the panorama image 500 is composed of at least two images captured from different image sensors 116a:116K at the same point in time. This enables the read-out of the images from the image sensors 116a:116k to be synchronized in time although the image sensors 116a:116k have different frame rates.

Such synchronized read-out of the images from the image sensors 116a:116k is also possible when the frame rate for a first group of the at least two groups 820a:820d is a multiple of the frame rate of a second group of the at least two groups 820a:820d. For example, assume that the frame rate for the image sensors in the first group is $f_1$ and that the frame rate for the image sensors in the second group is $f_2$, then $f_1 = c \cdot f_2$, where $c \geq 2$ is an integer.

Figure 7:
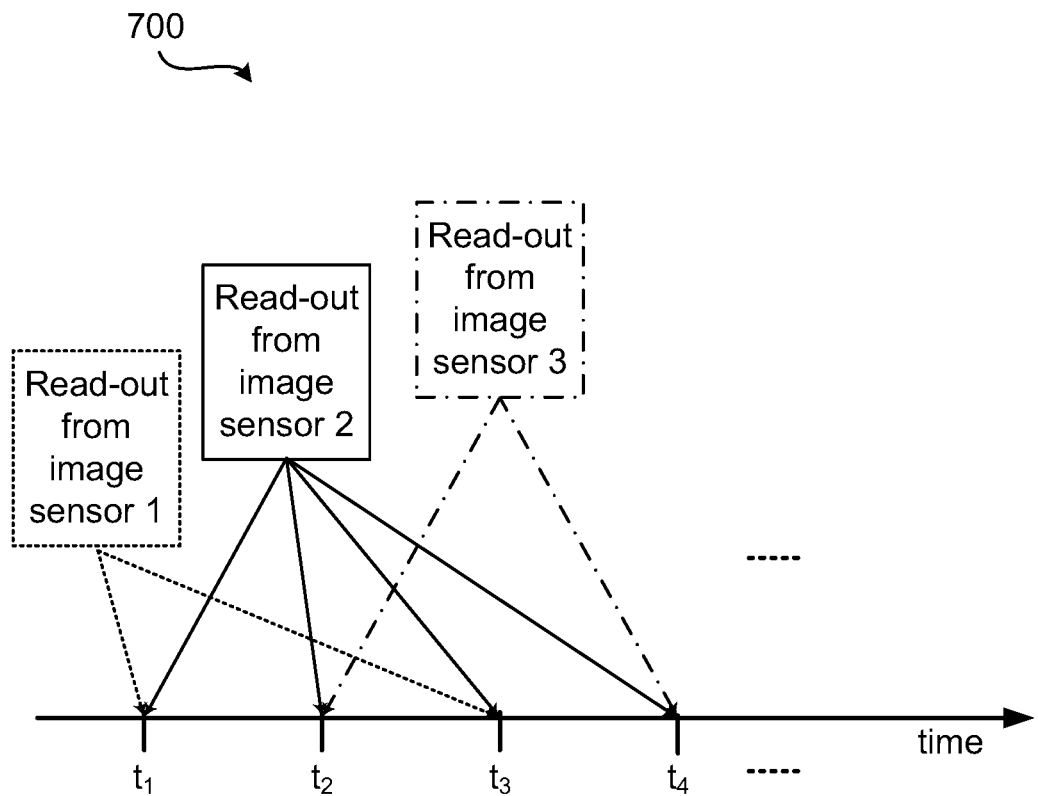
FIG. 7 schematically illustrates read-outs from image sensors according to an embodiment.

Further in this respect, the images captured by the image sensors 116a:116K in the first group of the at least two groups 820a:820d might be captured at a first set of occasions in time, and the images captured by the image sensors 116a:116K in the second group of the at least two groups 820a:820d might be captured at a subset of the first set of occasions in time. An example of this will be illustrated next. For illustrative purposes it is assumed that there are three image sensors, denoted "image sensor 1", "image sensor 2", and "image sensor 3". In this illustrative example, there are thus three groups of image sensors with one single image sensor per group. Assume further that read-outs from image sensor 1 are made at times $t_1$ and $t_3$, that that read-outs from image sensor 2 are made at times $t_1$, $t_2$, $t_3$, and $t_4$, and that read-outs from image sensor 3 are made at times $t_2$ and $t_4$, where $t_1$, $t_2$, $t_3$, and $t_4$ are four equidistant points in time. FIG. 7 at 700 schematically illustrates when the read-outs from each of the three image sensors will take place along a time line. Thus, there will be made four read-outs as follows:

Read-out at $t_1$: image sensor 1+image sensor 2;
Read-out at $t_2$: image sensor 2+image sensor 3;
Read-out at $t_3$: image sensor 1+image sensor 2; and
Read-out at $t_4$: image sensor 2+image sensor 3.

Hence, the frame rate for image sensor 2 can be set to be twice the frame rate of image sensor 1 and image sensor 3. This reduces the number of read-outs to be made at each point in time from three to two. In turn, this enables the peak power consumption of the camera 114 to be reduced.

Figure 8A:
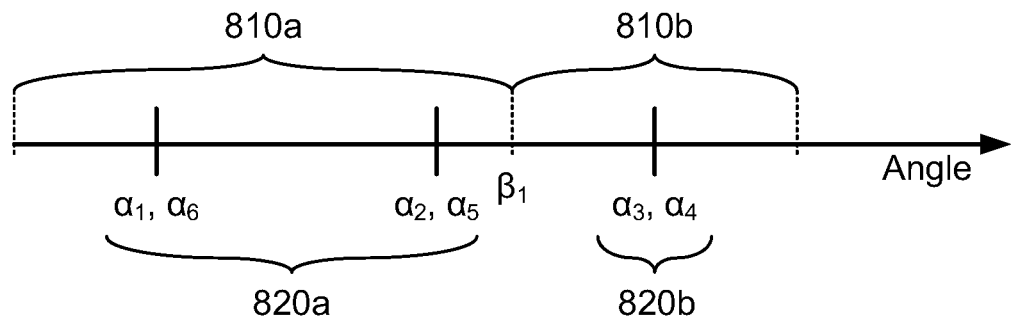
FIGS. 8A-C schematically illustrate grouping of image sensors according to an embodiment.
Figure 8B:
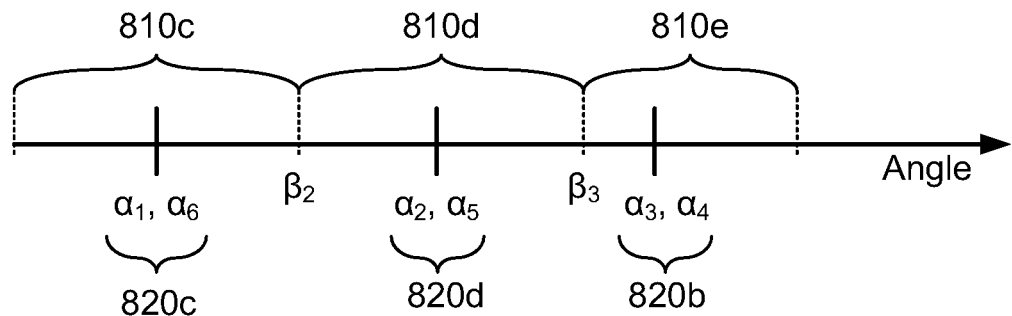
Figure 8C:
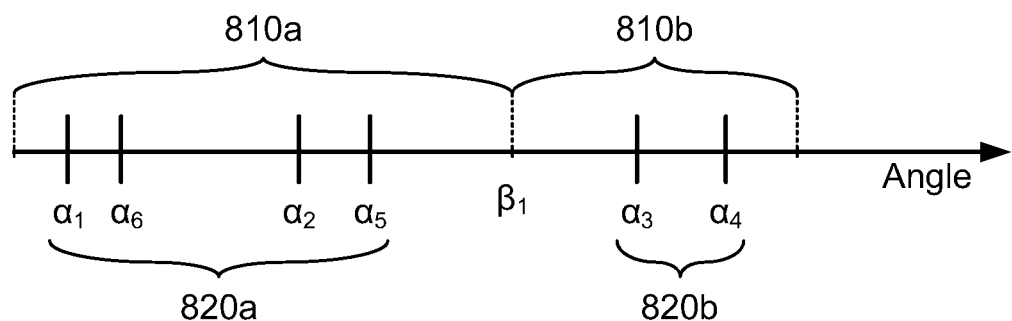

Further aspects of how to group the image sensors 116a:116K will be disclosed next with reference to FIG. 8. FIG. 8A, FIG. 8B, and FIG. 8C schematically illustrate different examples of image sensors (as represented by their angles $\alpha_1$, $\alpha_2$, $\alpha_3$, $\alpha_4$, $\alpha_5$, $\alpha_6$) can be grouped in different groups 820a, 820b, 820c, 820d according to continuous angle interval 810a, 810b, 810c, 810d, 810e. Adjacent continuous angle intervals are separated by threshold angle values $\beta_1$, $\beta_2$, $\beta_3$.

Staring with FIG. 8A, it is assumed that $\alpha_1 = \alpha_6$, that $\alpha_2 = \alpha_5$, and that $\alpha_3 = \alpha_4$. There are two continuous angle intervals 810a, 810b that are separated by threshold angle value $\beta_1$. Hence, the image sensors with angles $\alpha_1$, $\alpha_2$, $\alpha_5$, $\alpha_6$ define a first group 820a, and the image sensors with angles $\alpha_3$, $\alpha_4$ define a second group 820b.

In FIG. 8B, it is also assumed that $\alpha_1 = \alpha_6$, that $\alpha_2 = \alpha_5$, and that $\alpha_3 = \alpha_4$. There are three continuous angle intervals 810c, 810d, 820e that are separated by threshold angle values $\beta_2$ and $\beta_3$. Hence, the image sensors with angles $\alpha_1$, $\alpha_6$ define a third group 820c, the image sensors with angles $\alpha_2$, $\alpha_5$ define a fourth group 820d, and the image sensors with angles $\alpha_3$, $\alpha_4$ define a third group 820b.

In FIG. 8C, all angles $\alpha_1$, $\alpha_2$, $\alpha_3$, $\alpha_4$, $\alpha_5$, $\alpha_6$ are unique. As in FIG. 8A there are two continuous angle intervals 810a, 810b that are separated by threshold angle value $\beta_1$. Hence, the image sensors with angles $\alpha_1$, $\alpha_2$, $\alpha_5$, $\alpha_6$ define a first group 820a, and the image sensors with angles $\alpha_3$, $\alpha_4$ define a second group 820b.

FIGS. 8A-8C give examples where the number of groups 820a:820d is defined by selecting threshold angle values $\beta_{j; j=1 \ldots J}$ between the angle intervals 810a:810e. Hence, in some embodiments, the continuous angle intervals 810a:810e are separated by a number of threshold angle values $\beta_{j; j=1 \ldots J}$, and how many groups 820a:820d the plurality of image sensors 116a:116K are divided into depends on the number of threshold angle values $\beta_{j; j=1 \ldots J}$.

FIGS. 8A and 8B could represent scenario 300, whereas FIG. 8C could represent a scenario similar to scenario 300 but where the camera axis 220 is not exactly perpendicular to the direction D along which the straight path structure 310 extends through the scene 300.

With further respect to the angles $\alpha_1$, $\alpha_2$, $\alpha_3$, $\alpha_4$, $\alpha_5$, $\alpha_6$, these values are assumed to be known when having a calibrated camera 114. There could be different ways to calibrate the camera 114. However, how to calibrate the camera 114 is out of scope of the present disclosure. In some examples, the values of $\alpha_1$, $\alpha_2$, $\alpha_3$, $\alpha_4$, $\alpha_5$, $\alpha_6$ can be determined from image analysis of the scene 300, 400 once the camera axis 220 and the direction D is known. This is possible since the angles (for example represented by the angles $\delta_a$, $\delta_b$, ..., $\delta_k$, ..., $\delta_K$) at which the image sensors 116a:116K are directed relative the camera axis 220, as well as which projection the image sensors 116a:116K are using, are assumed to be known. How to determine the direction D has been disclosed above.

Figure 9:
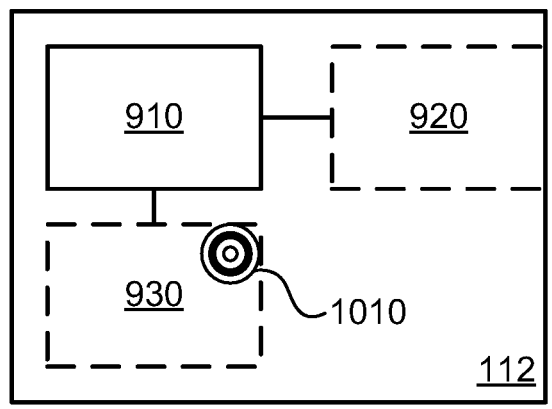
FIG. 9 is a schematic diagram showing functional units of a controller according to an embodiment.

FIG. 9 schematically illustrates, in terms of a number of functional units, the components of a controller 112 according to an embodiment. Processing circuitry 910 is provided using any combination of one or more of a suitable central processing unit (CPU), multiprocessor, microcontroller, digital signal processor (DSP), etc., capable of executing software instructions stored in a computer program product 1010 (as in FIG. 10), e.g., in the form of a storage medium 930. The processing circuitry 910 may further be provided as at least one application specific integrated circuit (ASIC), or field programmable gate array (FPGA).

Particularly, the processing circuitry 910 is configured to cause the controller 112 to perform a set of operations, or steps, as disclosed above. For example, the storage medium 930 may store the set of operations, and the processing circuitry 910 may be configured to retrieve the set of operations from the storage medium 930 to cause the controller 112 to perform the set of operations. The set of operations may be provided as a set of executable instructions.

Thus, the processing circuitry 910 is thereby arranged to execute methods as herein disclosed. The storage medium 930 may also comprise persistent storage, which, for example, can be any single one or combination of magnetic memory, optical memory, solid state memory or even remotely mounted memory. The controller 112 may further comprise a communications interface 920 at least configured for communications with other entities, functions, nodes, and devices, such as the camera 114 and other entities in FIG. 1. As such the communications interface 920 may comprise one or more transmitters and receivers, comprising analogue and digital components. The processing circuitry 910 controls the general operation of the controller 112 e.g., by sending data and control signals to the communications interface 920, by receiving data and reports from the communications interface 920, and by retrieving data and instructions from the storage medium 930. Other components, as well as the related functionality, of the controller 112 are omitted in order not to obscure the concepts presented herein.

Figure 10:
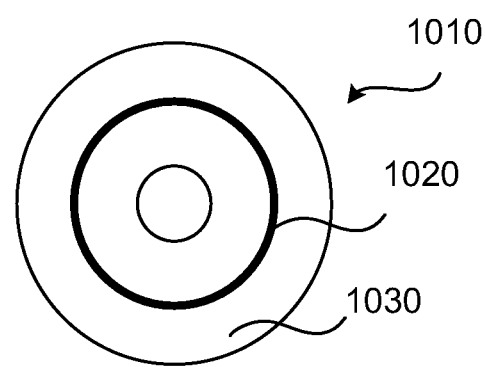
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 910 and thereto operatively coupled entities and devices, such as the communications interface 920 and the storage medium 930, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for setting frame rates of a camera, wherein the camera comprises a plurality of image sensors arranged to capture images to be stitched into a panorama image of a scene, and wherein a plurality of panorama images are combinable into video segments and each of the plurality of image sensors has a respective optical axis, the method being performed by a controller, the method comprising:
   obtaining information of a respective angle ($\alpha_{k;k=1\ldots K}$) between the optical axis of each of the plurality of image sensors and a direction along which a straight path structure, to be monitored by the camera, extends through the scene;
   dividing the plurality of image sensors into at least two groups as a function of the angles ($\alpha_{k;k=1\ldots K}$), wherein all the angles ($\alpha_{k;k=1\ldots K}$) of the image sensors within each of the at least two groups are part of its own continuous angle interval; and
   setting one frame rate per each of the at least two groups, wherein the frame rate decreases from the group with highest continuous angle interval towards the group with lowest continuous angle interval.

2. The method according to claim 1, wherein the camera has a camera axis being a mean value of the optical axes of all the image sensors, wherein the frame rate of any given image sensors among different groups of the plurality of image sensors decreases with increased difference between the optical axis of said any given image sensors and the camera axis.

3. The method according to claim 1, wherein the panorama image is composed of at least two images captured from different image sensors at the same point in time.

4. The method according to claim 1, wherein the frame rate for a first group of the at least two groups is a multiple of the frame rate of a second group of the at least two groups.

5. The method according to claim 4, wherein the images captured by the image sensors in the first group of the at least two groups are captured at a first set of occasions in time, and the images captured by the image sensors in the second group of the at least two groups are captured at a subset of the first set of occasions in time.

6. The method according to claim 1, wherein the continuous angle intervals are separated by a number of threshold angle values ($\beta_{j;j=1\ldots J}$), and wherein how many groups the plurality of image sensors are divided into depends on the number of threshold angle values ($\beta_{j;j=1\ldots J}$).

7. The method according to claim 1, wherein the straight path structure is a vehicle road, a pedestrian road, an office corridor, a railroad track, an airport taxiway, an airport runway, a canal for boats, a part of, or a track of, a sports arena.

8. The method according to claim 1, wherein the camera has a camera axis, and wherein the camera axis is either parallel with or perpendicular to the direction along which the straight path structure extends through the scene.

9. The method according to claim 1, wherein the frame rates take values in a set of predetermined frame rate values.

10. The method according to claim 1, further comprising:
    detecting presence of the straight path structure, and/or movement of the camera relative the straight path structure, by performing object detection and identification in the images, and wherein the frame rates are set in response thereto.

11. The method according to claim 1, further comprising:
    receiving user input to for setting frame rates of the camera, and/or to lower computational requirements for the camera, and wherein the frame rates are set in response thereto.

12. The method according to claim 1, wherein the plurality of image sensors collectively span a field-of-view of between 120° and 185°.

13. A controller for setting frame rates of a camera, wherein the camera comprises a plurality of image sensors arranged to capture images to be stitched into a panorama image of a scene, and wherein a plurality of panorama images are combinable into video segments and each of the plurality of image sensors has a respective optical axis, the controller comprising processing circuitry, the processing circuitry being configured to cause the controller to:

obtain information of a respective angle ($\alpha_{k;k=1\ldots K}$) between the optical axis of each of the plurality of image sensors and a direction along which a straight path structure, to be monitored by the camera, extends through the scene;

divide the plurality of image sensors into at least two groups as a function of the angles ($\alpha_{k;k=1\ldots K}$), wherein all the angles ($\alpha_{k;k=1\ldots K}$) of the image sensors within each of the at least two groups are part of its own continuous angle interval; and set one frame rate per each of the at least two groups, wherein the frame rate decreases from the group with highest continuous angle interval towards the group with lowest continuous angle interval.

14. A system, the system comprising a controller for setting frame rates of a camera, wherein the camera comprises a plurality of image sensors arranged to capture images to be stitched into a panorama image of a scene, and wherein a plurality of panorama images are combinable into video segments and each of the plurality of image sensors has a respective optical axis, the controller comprising processing circuitry, the processing circuitry being configured to cause the controller to:

obtain information of a respective angle ($\alpha_{k;k=1\ldots K}$) between the optical axis of each of the plurality of image sensors and a direction along which a straight path structure, to be monitored by the camera, extends through the scene;

divide the plurality of image sensors into at least two groups as a function of the angles ($\alpha_{k;k=1\ldots K}$), wherein all the angles ($\alpha_{k;k=1\ldots K}$) of the image sensors within each of the at least two groups are part of its own continuous angle interval; and set one frame rate per each of the at least two groups, wherein the frame rate decreases from the group with highest continuous angle interval towards the group with lowest continuous angle interval.

15. A computer program for setting frame rates of a camera, wherein the camera comprises a plurality of image sensors arranged to capture images to be stitched into a panorama image of a scene, and wherein a plurality of panorama images are combinable into video segments and each of the plurality of image sensors has a respective optical axis, the computer program comprising computer code which, when run on processing circuitry of a controller, causes the controller to:

obtain information of a respective angle ($\alpha_{k;k=1\ldots K}$) between the optical axis of each of the plurality of image sensors and a direction along which a straight path structure, to be monitored by the camera, extends through the scene;

divide the plurality of image sensors into at least two groups as a function of the angles ($\alpha_{k;k=1\ldots K}$), wherein all the angles ($\alpha_{k;k=1\ldots K}$) of the image sensors within each of the at least two groups are part of its own continuous angle interval; and set one frame rate per each of the at least two groups, wherein the frame rate is decreasing from the group with highest continuous angle interval towards the group with lowest continuous angle interval.

* * * * *